United States Patent
Schile

(10) Patent No.: US 7,683,153 B2
(45) Date of Patent: Mar. 23, 2010

(54) EPOXY RESIN WITH DIBASIC ACID (METHYL ESTER)/ETHYLENEUREA MODIFIER

(75) Inventor: Richard D. Schile, Ridgefield, CT (US)

(73) Assignee: ARDES Enterprises, Inc., Ridgefield, CT (US)

( * ) Notice: Subject to any disclaimer, the term of this patent is extended or adjusted under 35 U.S.C. 154(b) by 357 days.

(21) Appl. No.: 11/687,023

(22) Filed: Mar. 16, 2007

(65) Prior Publication Data

US 2008/0227950 A1 Sep. 18, 2008

(51) Int. Cl.
*C08G 59/14* (2006.01)
*C08L 63/02* (2006.01)

(52) U.S. Cl. .................. 528/117; 525/533

(58) Field of Classification Search .................. None
See application file for complete search history.

(56) References Cited

U.S. PATENT DOCUMENTS 2,210,588 A * 8/1940 Kranzlein et al. ........ 548/314.4
4,410,689 A * 10/1983 Barsa et al. ................ 528/367
7,528,200 B2 * 5/2009 Schile ........................ 525/523

OTHER PUBLICATIONS

CAS registry No. 1059060-21-7 for the reaction product of 2-ethyl-4-methylimidazole, formaldehyde and ethylene urea, 1940, one page.*
CAS registry No. 82780-81-2 for isophthaloyl bis(ethyleneurea), 1940, one page.*

* cited by examiner

*Primary Examiner*—Robert Sellers
(74) *Attorney, Agent, or Firm*—Notaro & Michalos P.C.

(57) ABSTRACT

Acyl-ethyleneurea terminated compounds based on the reaction of ethyleneurea with dibasic acids or methyl esters of dibasic acids or cyclic anhydrides are useful as modifying agents, cure accelerators and blocking agents with tertiary amine catalysts for epoxy resins. As epoxy modifiers, they react with epoxy resins at 120 degrees C. without a catalyst to produce modified epoxies having increased viscosity and increased reactivity and solvent power. When combined with a suitable tertiary amine catalyst, they are useful as cure accelerators at a low cure temperature of about 80 degrees C. When combined with a tertiary amine, they form complexes which provide superior latency of the epoxy-hardener mixture at 20 degrees C. Heat-curable epoxy-based compositions treated with the materials of the invention and processes whereby the various novel compositions of the invention are made, are also described.

13 Claims, No Drawings

EPOXY RESIN WITH DIBASIC ACID (METHYL ESTER)/ETHYLENEUREA MODIFIER

FIELD AND BACKGROUND OF THE INVENTION

The present invention relates generally to acyl-ethyleneurea terminated compounds or similar materials suitable for preparing epoxy-hardener mixtures exhibiting improved latency, epoxy resin compositions treated with the compounds or materials of the invention, and their method of preparation.

Epoxy resins vary greatly in molecular weight depending on the conditions of the manufacturing process. The higher molecular weight resins have higher hydroxy content which makes them more reactive. A good discussion of epoxy resin reactivity is given in the "EPON Resin Structural Reference Manual", chapters on EPON Resin Chemistry and on EPON Resins, formerly published by Shell. Epoxy resins are also frequently modified by reacting them with difunctional amines which increases their molecular weight, viscosity and hydroxy content. Epoxy resins which have been chemically modified are much more reactive and have shorter latency periods than unmodified resins when cured with blocked tertiary amines or imidazoles. Existing blocking agents are acidic materials which function by combining with the amine catalyst to protect the amine from interacting with the epoxy. These materials do not provide sufficient latency when used with modified epoxies.

The following definitions of terms apply:

An epoxy modifier is a difunctional compound which can be reacted with an epoxy resin by heating to increase the viscosity and hydroxy concentration and solvent power of the epoxy and which does not catalyze the epoxy crosslinking reactions. An accelerator is any compound which accelerates the rate of cure of the epoxy-hardener mixture at the cure temperature. Generally, any hydrogen donor that is active at the cure temperature is an accelerator. A blocker is a material which combines with a tertiary amine or imidazole to extend the time period at 20 degrees C. at the end of which the viscosity of the epoxy-hardener mixture increases beyond a specified level. The described acyl-ethyleneurea terminated materials perform all three functions: They are blockers for tertiary amines or imidazoles which inhibit cure at 20 degrees C., they are cure accelerators at or about 80 degrees C. and they function as epoxy modifiers when heated with the epoxy resin at about 120 degrees C. The term "epoxy hardener" refers generally to a combination of a tertiary amine or an imidazole and a blocker/accelerator as previously defined.

A need exists for a class of blocking agents/modifiers which provides epoxy-hardener mixtures with improved latency. The blocking agents/modifiers used to modify the epoxy resin are difunctional, acyl-ethyleneurea terminated compounds which provide two acidic bonding sites for a tertiary amine or an imidazole which do not contain any active hydrogen and which cannot react with the epoxy. The epoxy-reactive group is the ureido NH.

All references cited in this disclosure are incorporated by reference in their entirety.

SUMMARY OF THE INVENTION

An object of the present invention is to provide materials which can be used to improve the latency of epoxy-hardener systems. Latency is defined, for example, as the time period during which the viscosity of the epoxy-hardener mixture remains within specified bounds at ambient temperature. One solution is to protect the amine or imidazole hardener from interacting with the epoxy groups by binding it to an acidic agent referred to as a blocking agent or blocker. This works well when the hydroxy concentration of the epoxy resin is low. When the epoxy resin has been modified by reacting it with an active hydrogen compound to increase viscosity or to modify the mechanical properties of the cured epoxy, the hydroxy concentration and the reactivity of the epoxy are greatly increased and latency is reduced. Any groups such as secondary or tertiary amine groups which compete with the amine or imidazole for the blocker will release the amine or imidazole.

Existing blocking agents are polar, acidic polyols which are insoluble in the epoxy resin. The addition compound formed by combining the blocking agent with either a tertiary amine or an imidazole is epoxy-soluble, however these characteristics prevent the use of high concentrations of blocking agent which might be used to improve latency.

It is therefore desirable to have a blocking agent for an amine or imidazole that can improve the latency of an epoxy-hardener mixture which contains increased hydroxy concentration. The blocking agent of the present invention contains terminal acyl-ethyleneurea groups prepared by reacting a dibasic acid or a methyl ester thereof or a cyclic anhydride of the dibasic acid with ethyleneurea in the presence of a basic catalyst. The reaction is carried out preferably at a temperature ranging from 150-170 degrees C.

Some examples of dibasic acids include, but are not limited to, dibasic fatty acids, phthalic acid, isophthalic acid, carboxy terminated polybutadiene, carboxy terminated acrylonitrile-co-butadiene (CTBN), and long chain carboxy terminated products produced by reacting aliphatic diamines with dibasic acids or with the methyl esters of dibasic acids. The dibasic fatty acids preferably have backbones ranging from two to eight methylene groups.

Other examples include, but are not limited to, succinic acid or succinic anhydride, glutaric acid, adipic acid, pimelic acid, suberic acid, azelaic acid, sebacic acid, phthalic acid or phthalic anhydride, isophthalic acid, maleic acid or maleic anhydride, nadic anhydride, nadic methyl anhydride, hexahydrophthalic anhydride, tetrahydrophthalic anhydride, dodecyl succinic anhydride, carboxy terminated polybutadiene, carboxy terminated polybutadiene-acrylonitrile copolymer, and polymeric dibasic acids prepared by reacting n moles of an aliphatic diamine with n+1 moles of a dibasic acid.

It is another object of the present invention to provide blocking agents or epoxy modifiers having the chemical names glutarylbis(ethyleneurea) and isophthaloylbis(ethyleneurea).

It is another object of the present invention to provide a modified epoxy resin produced by mixing an epoxy resin with an amount of an epoxy modifier of the present invention sufficient to achieve a desired viscosity, reactivity and/or solvent power. Preferably, the modified epoxy resin is prepared by heating the epoxy resin and the modifier to about 120 degrees C. for 1 hour. The epoxy resin and the epoxy modifier may also be mixed at ambient temperature or at about 20 degrees C. The modified epoxy resin can be cured by adding a curing catalyst and an accelerator containing terminal acyl-ethyleneurea groups and heating the mixture to the cure temperature which can be, for example, 80 degrees C.

Some examples of curing catalysts include, but are not limited to, tertiary amines, dimethylbenzylamine, triethylenediamine, piperidine, imidazole, 2-ethyl-4-methylimidazole and ureoamines. Examples of ureoamines include the compounds disclosed in paragraphs [0020] to [0025] of U.S. patent application Ser. No. 11/345,509, entitled "Epoxy Hardeners Based on Aminomethylene-Ethyleneureas". The disclosure of this application is hereby incorporated by reference in its entirety.

An example of a suitable catalyst is EU/EMI, which can be prepared, for example, by reacting one mole of EMI with one mole of formaldehyde and one mole of ethyleneurea.

In one embodiment, the curing catalyst may be added to a mixture of the modified or unmodified epoxy resin and an accelerator containing terminal acyl-ethyleneurea groups. Alternatively, the curing catalyst may be first mixed with the accelerator before the mixture is added to the epoxy resin. Preferably, the accelerator comprises a tertiary amine or imidazole and a blocking agent containing terminal acyl-ethyleneurea groups prepared by contacting a dibasic acid or a methyl ester of the dibasic acid with ethyleneurea in the presence of a catalyst.

It is another object of the present invention to provide a method for producing a modified epoxy resin, comprising: (a) providing a modifying agent prepared by contacting a dibasic acid or a methyl ester of a dibasic acid with ethyleneurea in the presence of a basic catalyst at a predetermined temperature and for a predetermined time; and (b) mixing an epoxy resin with an amount of the modifying agent sufficient to achieve a desired viscosity, reactivity and/or solvent power.

It is another object of the present invention to provide a latent hardening agent having terminal acyl-ethyleneurea groups for improving the latency of an epoxy-hardener mixture comprising: (a) a tertiary amine or an imidazole hardening agent; and (b) an amount of a blocking agent containing terminal acyl-ethyleneurea groups prepared by contacting a dibasic acid or a methyl ester of the dibasic acid with ethyleneurea in the presence of a basic catalyst at a predetermined temperature and for a predetermined time, wherein the amount of the blocking agent is sufficient to produce the desired latency in the cured epoxy resin.

It is yet another object of the present invention to provide a method of improving the latency of a mixture of a hardener and a modified epoxy resin composition having increased hydroxy concentration, the method comprising the steps of: (a) heating an epoxy resin and a first modifying agent to form the modified epoxy resin composition; (b) mixing a catalytic hardening agent and a second modifying agent (accelerator) to form a modified hardening agent; and (c) mixing the modified epoxy resin composition and the modified hardening agent to form a mixture with the desired latency, wherein the modifying agents are prepared by contacting a dibasic acid or a methyl ester of the dibasic acid with ethyleneurea in the presence of a suitable catalyst at a predetermined temperature and for a predetermined time and wherein the second modifying agent inhibits cure of the mixture to maintain the viscosity of the mixture within a specified level for a period of time at or about 20 degrees C. and accelerates rate of cure of the mixture at or about 80 degrees C.

In an embodiment, the first modifying agent is the same as the second modifying agent. In another embodiment, the first and second modifying agents are composed of different acyl-ethyleneurea terminated compounds or materials. For example, glutarylbis(ethyleneurea) may be used as the first modifying agent and isophthaloylbis(ethyleneurea) may be used as the second modifying agent and vice versa. In yet another embodiment, the method of the present invention further comprises adding a curing catalyst to a mixture of the modified epoxy resin composition and the modified hardening agent. In a further embodiment, the method of the present invention further comprises first adding a curing catalyst to the modified hardening agent before the modified hardening agent is mixed with the modified epoxy resin composition.

The various features of novelty which characterize the invention are pointed out with particularity in the claims annexed to and forming a part of this disclosure. For a better understanding of the invention, its operating advantages and specific objects attained by its uses, reference is made to the accompanying descriptive matter in which a preferred embodiment of the invention is illustrated.

DESCRIPTION OF THE PREFERRED EMBODIMENTS

The improved blocking agents or epoxy modifiers of the present invention are difunctional compounds which have acyl-ethyleneurea terminal groups and which are made according to a preferred process by reacting a dibasic acid or preferably the methyl ester of a dibasic acid with, e.g., two moles of ethyleneurea. In one embodiment, the reaction is carried out at about 150-170 degrees C. with a strongly basic catalyst. Triethylenediamine, DABCO (diazabicyclooctane) is one example of such a basic catalyst although any suitable basic catalyst now known, or later developed in the art can also be used in the present invention. The catalyst must not be reactive. In a preferred embodiment, the concentration of the catalyst in the reaction mixture is 1 pph (parts per hundred).

The improved blocking agents or epoxy modifiers of the present invention are difunctional compounds which have acyl-ethyleneurea terminal groups and which are Examples of dibasic acids include although not limited to dibasic fatty acids ranging from succinic acid to sebacic acid having backbones ranging from two to eight methylene groups. Phthalic acid and isophthalic acid are also included as well as some materials containing polymeric backbones such as carboxy terminated polybutadiene and CTBN. Other suitable candidates are non-aromatic cyclic anhydrides. Long chain carboxy terminated materials can be produced by reacting aliphatic diamines with dibasic acids or their methyl esters, and are also included within the present invention. The acid amide groups do not compete with the amine or imidazole catalytic hardeners for the active sites in the blocker.

Blocking Agents and Epoxy Modifiers

While the term "blocking agents" best describes the function of the acyl-ethyleneurea terminated compounds or materials of the present invention, they also have other important capabilities or properties. For example, the acyl-ethyleneurea terminated compounds or materials of the present invention react readily with DGEBA (diglycidyl ether/bis-phenol-A) when heated and dissolved in the epoxy without a catalyst and are therefore easily utilized as epoxy reactive modifiers to, e.g., increase the viscosity, reactivity and/or solvent power of the epoxy. When used as a part of the hardener in combination with a tertiary amine or imidazole catalyst, they react very rapidly with the epoxy at the cure temperature resulting in a substantial increase in the rate of cure while at the same time increasing latency.

The blocking agents or epoxy modifiers of the present invention possess the following properties:

a) Epoxy solubility when heated independently of the amine or imidazole catalyst which helps to control latency by increasing blocker concentration.

b) Effective blocking capability with an amine or imidazole combined with a low activation temperature which allows curing, for example, at 80 degrees C.

c) Ability to function as both a co-curative/accelerator with an amine or imidazole catalyst as part of the hardener mixture and as an epoxy reactive modifier which is pre-reacted with the epoxy before adding the hardener to increase viscosity or to improve mechanical properties of the cured epoxy resin.

d) When used as an epoxy modifier, one acyl-ethyleneurea blocking group is provided for each hydroxy group generated by the reaction with epoxy. The blocking group competes with the hydroxy group for the tertiary amine or imidazole which results in only a moderate reduction in latency. The latency can be fully restored by adding additional blocker to the hardener. The result is an epoxy resin composition which has the same or longer latency compared to the unmodified epoxy, reduced cure time and improved properties of the cured epoxy system. In comparison, chemical modification of an epoxy by an amine-functional modifier results in competition between the residual amine groups and the tertiary amine or imidazole for the active sites in the blocker which results in release of the amine or imidazole hardener and loss of latency.

Dibasic Acids

The dibasic acids are an extremely diverse group of materials and the methyl esters are widely available at low cost. However, the number of such materials can be considerably increased by noting that long chain dibasic acids can be synthesized by, for example, reacting a diamine with 2 moles of a dibasic acid or its dimethyl ester. In particular, when the diamine is polyoxypropylenediamine, long chain dibasic acids are produced which may be useful as epoxy modifiers/tougheners. Also, the dibasic acids can be used directly when the methyl esters are not readily available. It should also be noted that it is the acyl-ethyleneurea terminal groups of such materials which provide their blocking capabilities, and it is not necessary that the same blocking compound be used to pre-react with the epoxy to modify the properties of the epoxy and also as part of the hardener to control latency and cure rate. For example, it is perfectly possible to modify the epoxy using glutarylbis(ethyleneurea) and to use isophthaloylbis (ethyleneurea) as part of the hardener.

In a preferred embodiment, the blocking agents or epoxy modifiers are prepared by reacting dimethylisophthalate or dimethylglutarate with two moles of ethyleneurea. The test data which follows is based mostly on the use of the blocking agent isophthaloylbis(ethyleneurea) having the structure (I) shown below; however, the present invention is not limited to any specific examples.

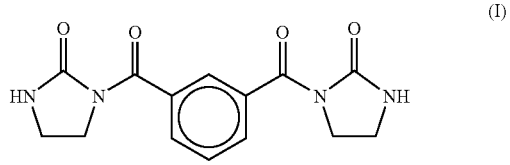

(I)

The two carbonyl groups of isophthaloylbis(ethyleneurea) form a strongly electron-deficient, chelate structure which has a strong attraction to a nitrogen atom.

The following examples illustrate exemplary embodiments of the invention; the scope, however, is defined in the claims.

All testing was carried out using Epon® 828. The cure temperature was 80 degrees C. in all cases. The catalytic hardener used was EU/EMI which is a modified 2-ethyl-4-methylimidazole made, e.g., by reacting one mole EMI with one mole formaldehyde and one mole ethyleneurea. EU/EMI has the structure (II) shown below. This hardener is surprisingly effective at very low concentrations due probably to the presence of four active nitrogen atoms capable of donating an electron pair. It is also quite latent independent of any blocking agent but cures slowly at low concentrations. This catalytic hardener is an example of a ureidoamine which was disclosed in U.S. patent application Ser. No. 11/345,509 U.S. Pat. No. 7,528,200.

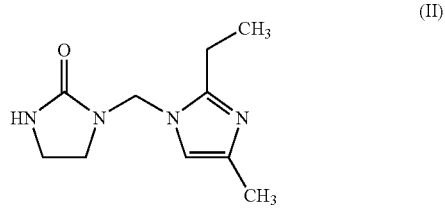

(II)

EXAMPLES 1) 2 phr EU/EMI, baseline
   7 days latency (2× viscosity increase)
   6 hr. cure @80 degrees C.
2) 6 phr isophthaloylbis(ethyleneurea), dissolved in the epoxy by briefly heating to about 100 degrees C.
   2 phr EU/EMI, dissolved with gentle heating.
   8 days latency (2× viscosity increase).
   4 hr. cure @ 80 degrees C.
3) 6 phr isophthaloylbis(ethyleneurea), pre-reacted with the epoxy at 120 degrees C., 1 hour.
   2 phr EU/EMI
   The cure time at 80 degrees C. was 3 hr.
   Latency was 6 days (2× viscosity increase).
4) 6 phr isophthaloylbis(ethyleneurea), pre-reacted with the epoxy resin at 120 degrees C., 1 hr.
   The modified epoxy was an extremely viscous, semi-solid at ambient temperature but the viscosity at 120 degrees C. was very low.
   6 phr isophthaloylbis(ethyleneurea), dissolved in the modified epoxy at about 80 degrees C.
   2 phr EU/EMI, dissolved with gentle heating.
   This mixture was a highly viscous semi-solid at ambient temperature.
   There was no detectable viscosity increase after 10 days at ambient temperature.
   The mixture was still flowable after 15 days.
   A sample was cured after 11 days. The mixture had a medium-low viscosity at 80 degrees C. The cure time @80 degrees C. was 2 hr.
5) The hardener was 6 phr isophthaloylbis(ethyleneurea) pre-reacted with the epoxy and another 6 phr added without reaction.
   There was no EU/EMI catalyst.
   Latency was 20 days (2× viscosity increase) at ambient temperature.
6) 6 phr isophthaloylbis(ethyleneurea)
   1 phr EU/EMI
   The cure time at 80 degrees C. was 12 hr.
   Latency was 15 days (2× viscosity increase).
7) 6 phr glutarylbis(ethyleneurea)
   2 phr EU/EMI
   The cure time at 80 degrees C. was 3 hr.

Latency was 6 days (2× viscosity increase).
8) 6 phr glutarylbis(ethyleneurea), pre-reacted with the epoxy at 120 degrees C., 1 hr.
2 phr EU/EMI
The cure time at 80 degrees C. was 3 hr.
Latency was 5 days (2× viscosity increase).

Discussion of Test Results

The theoretical formula weights of the materials used are as follows: EU/EMI, 208.3; isophthaloylbis(ethyleneurea), 302.3; glutarylbis(ethyleneurea), 268.3. Thus, in all of the test examples a large excess of blocker was used above the theoretical ratio of one unit of EU/EMI per unit of acyl-ethyleneurea.

Pre-reaction of the epoxy with 6 phr isophthaloylbis(ethyleneurea) resulted in a highly viscous semi-solid modified resin at ambient temperature. Subsequent addition of additional blocker and EU/EMI resulted in a decrease in viscosity due to the solvent effect. Pre-reaction of the epoxy with 6 phr glutarylbis(ethyleneurea) resulted in a smaller increase in viscosity than with the same amount of isophthaloylbis(ethyleneurea).

Although doubling of the initial viscosity signified the end of the latency period, all of the samples remained viscous, flowable liquids for much longer times with high viscosity index and good flow at the cure temperature. Isophthaloylbis(ethyleneurea) probably gives the highest glass transition temperatures. Other candidate materials or compounds utilizing long, aliphatic backbones or polyamide backbones may also be used as epoxy tougheners/modifiers. Although the testing was carried out with two acyl-ethyleneureas, in view of the above description, it should be understood by a person having ordinary skill in the art that the invention can be practiced with other acyl-ethyleneurea terminated compounds or materials of the present invention.

Conclusions

1. EU/EMI is a surprisingly effective catalytic hardener at low concentrations of 1-2 phr, particularly considering that the EMI content is only about 50%.
2. All of the samples cured with either isophthaloylbis(ethyleneurea) or glutarylbis(ethyleneurea) and EU/EMI cured faster than those samples cured with EU/EMI catalyst alone, illustrating that the acyl-ethyleneurea blocking agents of the present invention are also cure accelerators at 80 degrees C.
3. Pre-reaction of the epoxy with either isophthaloylbis(ethyleneurea) or glutarylbis(ethyleneurea) resulted in a moderate decrease in latency and a reduction in cure time. The reduction in latency was less than would be expected from an amine-functional modifier.
4. Latency reduction due to pre-reaction of the epoxy with isophthaloylbis(ethyleneurea) was compensated for by addition of more of this material to the hardener mixture (see Examples 3, 4).
5. Glutarylbis(ethyleneurea) is slightly less latent and slightly faster curing than isophthaloylbis(ethyleneurea) when catalyzed by EU/EMI.

Preparation of Acyl-Ethyleneureas

Acyl derivatives of ethyleneurea can be prepared from the acyl chlorides, the cyclic anhydrides (in some cases), the dibasic acids or the methyl esters of dibasic acids. The latter alternative is preferred because of the wide availability and low cost of the methyl esters.

The reaction between the methyl ester of a dibasic acid and ethyleneurea is similar to the trans-esterification reaction due to the nearly neutral character of the substituted urea. In one embodiment, a strongly basic catalyst and a temperature of about 150-170 degrees C. are used.

The water content of ethyleneurea is a potential problem resulting in short weighting if not accounted for. A workable solution is to use a short air condenser attached to the reaction flask, take the tare weight and then weigh the methyl ester into the reaction flask and add the theoretical amount of ethyleneurea, assuming zero water content. The mixture is then heated to about 100-120 degrees C. to drive off water while refluxing the methyl ester. The boiling points of the methyl ester and water are well separated so this is a simple distillation. The gross weight is then taken and the water lost is determined by the difference. The water content of the ethyleneurea is then calculated and additional (wet) ethyleneurea is then added to compensate. Excess ethyleneurea should be avoided as it is easier to remove unreacted methyl ester than unreacted ethyleneurea. The drying process is then repeated.

Alternatively, the reaction can proceed without correcting for the weight of ethyleneurea and the unreacted methyl ester removed at the end of the process. A basic catalyst is then added and the mixture heated to 150-170 degrees C. which results in refluxing of the unreacted methyl ester and evolution of methanol. Several catalysts have been tried and the best was TED (triethylenediamine, DABCO, diazabicyclooctane) at a concentration of 1 pph based on the total weight of reactants. The catalyst is distilled off at the end along with any unreacted methyl ester. Most of the methyl esters of interest are liquids except for dimethylisophthalate which is a solid, m.p. 70 degrees C.

While specific embodiments of the invention have been shown and described in detail to illustrate the application of the principles of the invention, it will be understood that the invention may be embodied otherwise without departing from such principles.

What is claimed is:

1. A modified epoxy resin composition comprising: a modified epoxy resin having been prepared by heating an epoxy resin with an epoxy reactive modifier at a temperature of about 120 degrees C. for 1 hour, the epoxy reactive modifier having been prepared by heating two moles of ethyleneurea with a methyl ester of a dibasic acid and a basic catalyst to about 150-170 degrees C., the composition further comprising an amine curing catalyst and a blocking agent which is an isophthaloylbis(ethyleneurea) which is the same or different from the epoxy reactive modifier, the function of which, when mixed with the curing catalyst, is to inhibit curing of the epoxy resin composition at 20 degrees C. and to accelerate curing at a cure temperature at or about 80 degrees C.

2. The modified epoxy resin composition of claim 1, wherein the epoxy resin is a diglycidylether of bis-phenol A.

3. The modified epoxy resin composition of claim 1, wherein the dibasic acid of the methyl ester of the dibasic acid is selected from the group consisting of: succinic acid, glutaric acid, adipic acid, pimelic acid, suberic acid, azelaic acid, sebacic acid, phthalic acid, isophthalic acid, and maleic acid.

4. The modified epoxy resin composition of claim 1, wherein the basic catalyst is triethylenediamine or DABCO (diazabicyclooctane).

5. The modified epoxy resin composition of claim 1, wherein the epoxy reactive modifier is a compound isophthaloyl bis(ethyleneurea) represented by Structure I:

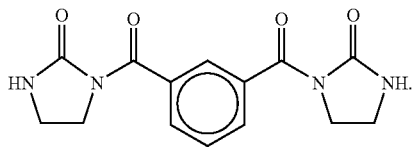

(I)

6. The modified epoxy resin composition of claim 1, wherein the curing catalyst is produced by reacting one mole 2-ethyl-4-methylimidazole with one mole formaldehyde and one mole ethyleneurea, the curing catalyst having the Structure (II)

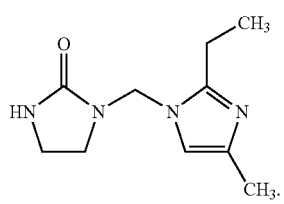

(II)

7. The modified epoxy resin composition of claim 1, wherein the epoxy reactive modifier is glutaryl bis(ethyleneurea).

8. The modified epoxy resin composition of claim 1, wherein the blocking agent is a compound isophthaloyl bis(ethyleneurea) represented by Structure I:

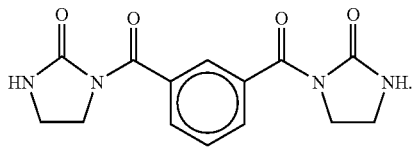

(I)

9. The modified epoxy resin composition of claim 1, wherein the concentration of the curing catalyst is 1-2 parts per hundred of the modified epoxy resin.

10. The modified epoxy main composition of claim 2, wherein the dibasic acid of the methyl ester of the dibasic acid is selected from the group consisting: of succinic acid, glutaric acid, adipic acid, pimelic acid, suberic acid, azelaic acid, sebacic acid, phthalic acid, isophthalic acid, and maleic acid.

11. The modified epoxy resin composition of claim 2, wherein the epoxy reactive modifier is a compound isophthaloyl bis(ethyleneurea) represented by Structure I:

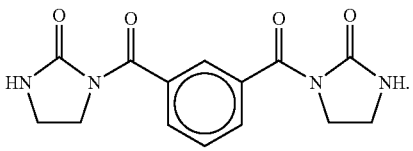

(I)

12. The modified epoxy resin composition of claim 2, wherein the curing catalyst is produced by reacting one mole 2-ethyl-4-methylimidazole with one mole formaldehyde and one mole ethyleneurea, the curing catalyst having the Structure (II)

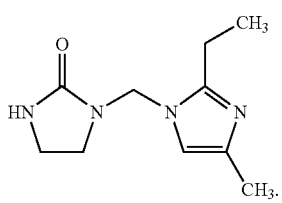

(II)

13. The modified epoxy resin composition of claim 2, wherein the blocking agent is a compound isophthaloyl bis(ethyleneurea) represented by Structure (I)

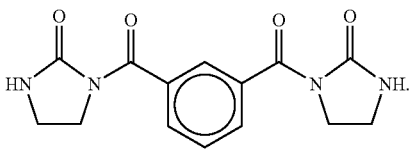

(I)

* * * * *